United States Patent [19]

Chappell, Jr.

[11] 4,263,655
[45] Apr. 21, 1981

[54] DIGITAL INTERFACE CIRCUIT FOR CONTROL OF PRESSURE SCANNER

[75] Inventor: John A. Chappell, Jr., Yorktown, Va.

[73] Assignee: The United States of America as represented by the Secretary of the Army, Washington, D.C.

[21] Appl. No.: 60,948

[22] Filed: Jul. 26, 1979

[51] Int. Cl.³ .......................................... G06F 15/20
[52] U.S. Cl. .................................. 364/558; 318/562; 364/103; 364/900
[58] Field of Search ............... 364/103, 120, 558, 900; 318/562

[56] References Cited

U.S. PATENT DOCUMENTS

| | | | |
|---|---|---|---|
| 3,129,323 | 4/1964 | Stout et al. | 364/103 |
| 3,260,998 | 7/1966 | Fluegel | 364/103 |
| 3,689,748 | 9/1972 | Bothne | 364/558 |
| 3,878,376 | 4/1975 | Sholes, Jr. et al. | 364/558 |
| 4,090,248 | 5/1978 | Swanson et al. | 364/900 |

Primary Examiner—Errol A. Krass
Attorney, Agent, or Firm—Nathan Edelberg; William J. Sheehan; Norman L. Wilson, Jr.

[57] ABSTRACT

Digital interface circuitry links a number of solenoid-driven, multiple-port, single-transducer pressure-scanning devices to a digital data acquisition microprocessor system having a random access interface which directs operation of the microprocessor CPU. Pulses from the CPU are utilized by the digital interface to step the scanning solenoid and command the CPU to scan the current inputs from the pressure devices. The digital interface receives a digital signal from a binary encoder when the pressure scanning system has reached the last active pressure port and then returns the scanning system to home position and inputs the next user command to the CPU.

10 Claims, 1 Drawing Figure

DIGITAL INTERFACE CIRCUIT FOR CONTROL OF PRESSURE SCANNER

BACKGROUND OF THE INVENTION

The present invention relates to circuitry for controlling the operation of multiple-port, single-transducer pressure-sensing devices for inputting data to a digital data acquisition system.

In the prior art, gathering pressure data from a plurality of points has been performed by pressure-scanning apparatus which utilizes a single transducer stepped from port to port by solenoid or motor drives. A controller for the scanning apparatus defines which port is currently sampled.

In gathering test data, such as temperature, from a plurality of points by utilizing a separate transducer for each point, digital computers have been utilized to control scanning of the points and to receive and record the data. Where pressure data is also to be received from multiple-port, single-transducer pressure-scanning devices, control of the apparatus has been clumsy.

SUMMARY OF THE INVENTION

The principal object of the present invention is to provide an interface circuit whereby multiple-port, single-transducer pressure-scanning devices may be controlled by a digital computer which may simultaneously receive other types of data.

Briefly summarized, the present invention, an interface circuit, achieves this object by utilizing a pulse, produced by the computer CPU when a specific channel is reached, to simultaneously step the solenoid-drives of a number of pressure-scanning devices and cause the computer to start and scan the pressure inputs; these same channels are utilized repeatedly by stepping and scanning the pressure devices until all the pressures have been scanned. When the last active pressure port has been read, the interface responds to outputs from the pressure-scanning apparatus to cause the apparatus to return to its home position and initiate the next user command to the computer. The user indicates to the CPU which will be the first and last channels utilized for the pressure-scanning devices and may transmit other commands to the computer by a system of thumbwheel switches.

DESCRIPTION OF THE PREFERRED EMBODIMENT

Figure 1:
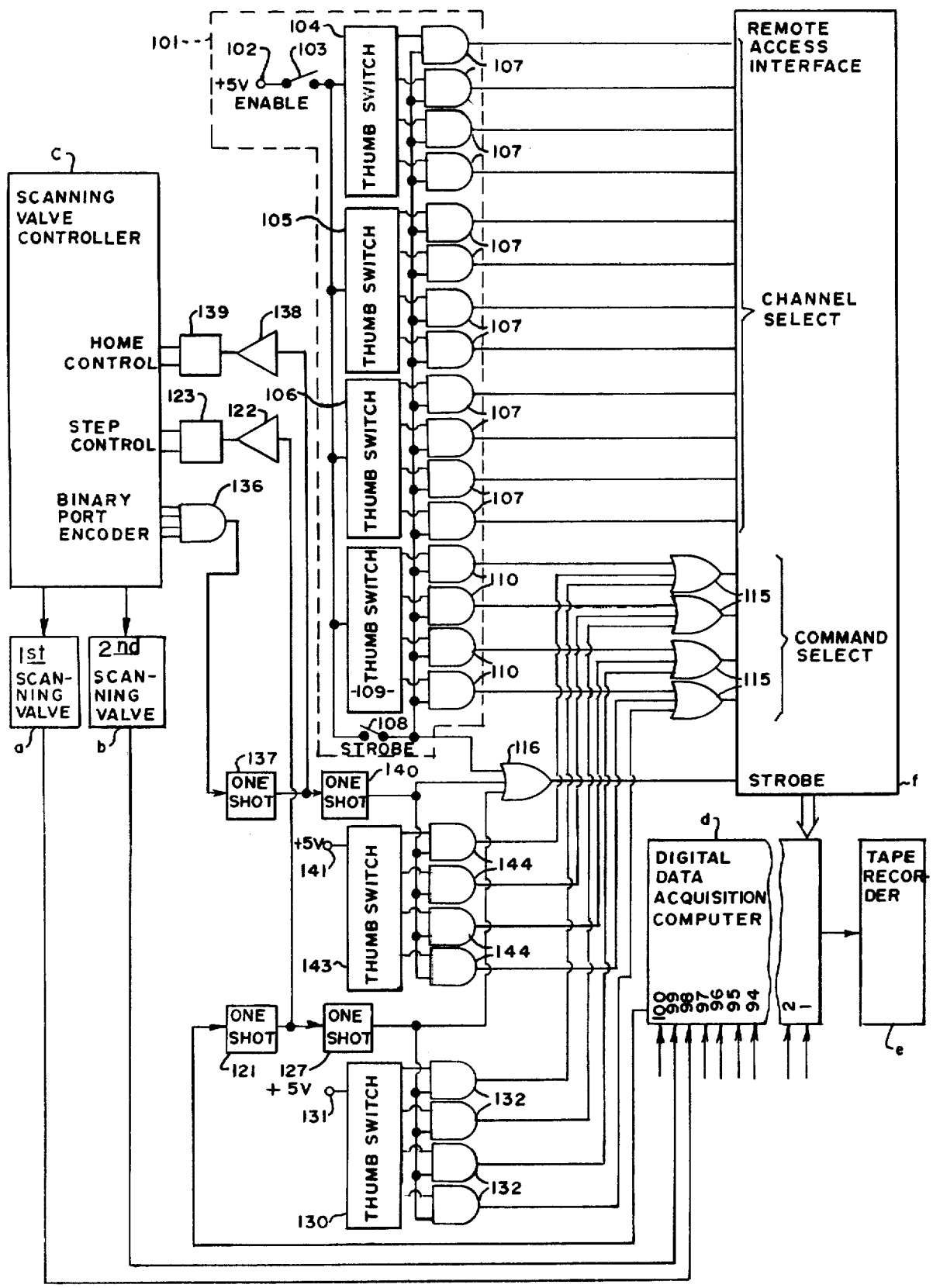
FIG. 1 is a schematic circuit diagram of the present digital interface circuit shown linking a typical pressure scanning system to a digital data acquisition computer system.

The present invention is embodied in an interface circuit which links a number of solenoid-driven multiple-port single-transducer pressure scanning valves, which are controlled by a scanning valve controller, to a digital data acquisition microprocessor-controlled computer system, and by its unique construction permits gathering pressure data from a large number of points and inputting them to the computer on a limited number of channels, so that the computer has other channels available for receiving other data, such as temperatures and fluid levels.

Summarized briefly, the interface circuit utilizes a pulse, produced by the microprocessor CPU when its last channel is reached, to simultaneously step the solenoid drives of the scanning valves and to cause the computer to random access start its scanning at several channels prior to the last channel, chosen so that one channel is available for each scanning valve. The computer scans these channels and then again produces a pulse, upon which the interface causes the scanning valves to step to their next port and start the computer again to scan beginning with the first selected channel. This repeats until the last active pressure port has been read; then the interface circuit responds to outputs from the scanning controller to cause the scanning valve to return to home position and to initiate a post-scan command for the microprocessor.

Described in detail, the preferred embodiment of the present invention utilizes a lapped shearing surface type of scanning valve system, such as that manufactured and sold under the registered trademark SCANIVALVE ® by Scanivalve, Inc., of San Diego, California. Each scanning valve a, b is of the type having a single transducer and forty-eight ports serviced by the transducer; a solenoid drive is utilized to step the pressure transducer from port to port. The sanning valves a, b each have an analog output representative of the measured pressure. For purposes of this explanation, a more detailed description of this conventional scanning valve is not required.

To control stepping of the scanning valve, a conventional scanning valve solenoid controller c is utilized, and in the preferred embodiment is likewise manufactured by Scanivalve, Inc. The scanning valve controller c has a step control input, which when energized causes the scanning valves to simultaneously step to their next port, and it has a home control input, which when energized causes the scanning valves a, b to return to their home position, adjacent the first port to be scanned. The scanning valve controller has a plurality of digital outputs which indicate in binary notation which port is currently being scanned. In FIG. 1, these digital outputs are designated binary port encoder. By choosing the proper combination of these digital outputs, it is possible to determine when the last active port is currently being scanned.

The present interface circuit is further linked to a digital data aquisition microprocessor-controlled computer system having a digital data acquisition computer d with one hundred input channels upon which it can receive analog data, designated 1-100 on the computer d shown in FIG. 1. The computer d utilizes a digital voltmeter (analog to digital converter), to put the data into digital form for transmission to a recording device e. In the preferred embodiment, the computer utilized is the AUTODATA EIGHT model manufactured by Vidar Autodata, Inc., Mountainview, California.

Though the computer may be operated from its front panel, a remote access interface f is provided. This remote access interface f, manufactured by Vidar Autodata, Inc. for use with the AUTODATA EIGHT computer, permits the user of input commands and make channel selections from remote locations. The remote access interface f has seventeen input lines, twelve lines which accept three binary coded decimal (BCD) characters to select the first and last channels to be scanned, four command select lines which accept one BCD character, and one line as a strobe input, which upon being energized toggles the information on the other sixteen lines into the remote access interface f.

By this the user may select any channel 1 through 999. The following commands or control codes are utilized:

| Four-bit code | Operation |
| --- | --- |
| 0000 | latch first channel |
| 0001 | latch last channel |
| 0010 | stop |
| 0011 | random access start |
| 0100 | start |
| 0101 | print on |
| 0110 | print off |

The interface circuit for linking the scanning valve apparatus with the computing system is made up of the remainder of the apparatus shown in FIG. 1. The interface circuit includes a user control circuit 101 by which an operator can make channel selections and give commands to the computer d via the remote access interface f. Power is supplied to the user control circuit 101 from a five-volt supply 102 through an enable switch 103. A group of three thumbwheel switches 104, 105, 106 receive their power from the enable switch 103. These three thumbwheel switches 104-106 are of the type which convert a visually observable thumbwheel marked with digits 0-9 to binary coded decimal on four switch output lines. Thus, the three thumbwheel switches 104-106 together have twelve output lines by which can be represented the numerals 0-999 in binary coded decimal. Twelve two-input AND gates 107 are provided, each recieving at one of its inputs an output of one of the thumbwheel switches 104-106. Each of the other inputs of these AND gates 107 is coupled from the enable switch 103 through a momentary contact strobe switch 108. The outputs of these twelve AND gates 107 form outputs of the user control circuit 101 which are inputted to the twelve channel select input lines of the remote access interface f.

In addition to the set of three thumbwheel switches 104-106, a fourth similar thumbwheel switch 109 is connected to the enable switch 103. Four two-input AND gates 110 are provided, each receiving at one of its inputs an output of the fourth thumbwheel switch 109. These four AND gates 110 each are coupled by their second input to the enable switch 103 via the strobe switch 108.

The four outputs of the user control circuit 101 formed by the outputs of the four AND gates 110 are coupled each to one input of four three-input OR gates 115, whose outputs are inputted to the command select inputs of the remote access interface f. In addition, another output of the user control circuit 101 is formed from the output of the strobe switch 108. This output is inputted to one of the three inputs of a fifth three-input OR gate 116, whose output is inputted to the strobe input of the remote access interface f.

The interface circuit further includes a step control circuit made up of a first 100 msec one-shot 121, which delivers a 100 msec pulse to a relay driver 122 to close a normally open relay 123 coupled to the step control input of the scanning valve controller c. The input of the one-shot 121 is coupled to receive the pulse from the digital data acquisition computer d which is produced when the computer d scans its channel designated 100. An alternate output of the step control circuit, formed by the output of the first 100 msec one-shot 121, drives the input of a first 10 msec one-shot 127 which produces a 10 msec pulse and is utilized as a remote access start circuit.

For use in preparing a remote access start command for transmission to the remote access interface f, a fifth thumbwheel switch 130 having four-bits which convert a visual 0-9 thumbwheel indication to BCD is utilized. Power is received from a five-volt supply 131. Four two-input AND gates 132 receive respectively the four outputs of the thumbwheel switch 130 at one of their inputs. The other input of each AND gate 132 is coupled to the output of the first 10 msec one-shot 127. The output of that second one-shot 127 is also inputted to another input of the fifth OR gate 116.

A home control circuit, provided to cause the scanning valves a, b to return to home position when the last active port has been scanned, includes a four-input AND gate 136 having its inputs so connected to the proper outputs of the binary port encoder of the scanning valve controller c that all of its inputs, and therefore its output, are a digital high output upon the thirty-ninth ports being scanned. The output of the four-input AND gate 136 drives the input of a second 100 msec one-shot 137; the output of the 100 msec one-shot 137 is coupled to a relay driver 138 which drives a relay 139 coupled to the home control input of the scanning valve controller c.

An alternate output of the home control circuit formed by the output of the second 100 msec one-shot 137 drives a second 10 msec one-shot 140, sometimes later referred to as a post-scan command circuit.

A sixth similar thumbwheel switch 143 is connected from its five-volt power supply 141 to four two-input AND gates 144, each receiving one of the bit outputs of the thumbwheel switch 143. The remaining input of each AND gate 144 receives the output of the second 10 msec one-shot 140, which output is also inputted to the third input of the fifth OR gate 116. The outputs of the four AND gates 144 are coupled to their respective OR gates 115 at the command select input of the remote access interface f.

In operation of the described interface circuit, to control the scanning of 76 pressure points, as well as 97 other analog data channels, the user first sets the group of three thumbwheel switches 104-106 for the first channel of the two channels of the digital data acquisition computer d which will be utilized in scanning the two pressure scanning valves a, b. In the use of this preferred embodiment, this is channel 98. The fourth thumbwheel switch 109 is set to the four-bit code 0000, corresponding to the latch first channel command. The enable switch 103, open to limit false triggering due to noise, is closed. When the strobe switch 108 is then closed, the channel select, command select and strobe inputs of the remote access interface f all receive the desired digital information. Then the last channel to be utilized in scanning the pressure scanning valve a, b is entered on the group of three thumbswitches 104-106 (in the preferred embodiment, channel 100) and the four-bit code 0001 corresponding to the latch last channel command is set on the fourth thumbwheel switch 109. Closure of the strobe switch 108 inputs this information to the remote access interface f.

Before operation is to begin, the fifth thumbwheel switch 143 is set for the random access start command, corresponding to the four-bit code 0011. The sixth thumbwheel switch 143 is set for a post-scan command, usually a stop operation, corresponding to the four-bit code 0010.

Once the digital data acquisition computer d is set to properly receive the other channel inputs 1–97, as well as channels 98 and 99, the scanning operation may be initiated, either through the present interface circuit or at the computer front panel. Where start-up is to be done from the present interface circuit, the fourth thumbwheel switch 109 is set with the four-bit code 0100 corresponding to the start operation and the enable switch 103 and strobe switch 108 are closed, causing the computer d to begin scanning with channel 1. As it initially scans through channels 98 and 99, the scanning valves a, b are at home position and no data is collected. Upon the computer d reaching channel 100, the computer d produces a pulse which is inputted to the first 100 msec one-shot 121. The resulting pulse from the one-shot 121 energizes the relay driver 122, which energizes the relay 123 at the step control input to the scanning valve controller c, causing the first and second scanning valves a, b to simultaneously step to their first port. The first 10 msec one-shot 127, also driven by the 100 msec one-shot 121, produces this pulse which causes the operation command to be toggled in from the fifth thumbwheel switch 130, previously set, in this preferred embodiment, for the random access start command. The strobe input of the remote access interface f likewise receives the 10 msec pulse, via the OR gate 116. This causes the computer d to remote access start, as previously set by the user control circuit 101 to begin scanning with channel 98, which receives the output of the first scanning valve a. The computer d then scans channel 99, receiving the output of the second scanning valve b. As the computer d then scans channel 100, it again produces the pulse input to the first 100 msec one-shot 121. This causes the entire previous cycle to repeat; stepping of the scanning valves to their second port, random access starting of the computer, and subsequent scanning of the two valves on channels 98 and 99.

This cycling or loop repeats until the last active port has been scanned. In the preferred embodiment this is port 38 of each of the 48-port scanning valves. Upon stepping to channel 39, the four inputs to the four-input AND gate 136 from the binary port encoder outputs are all high, causing the output of the AND gate 136 to go high and drive the second 100 msec one-shot 137 on. This causes the relay driver 138 to energize the relay 139 at the home control input of the scanning valve controller c, causing the first and second scanning valves a, b to be stepped to their home positions. Further, the second 10 msec one-shot 140 pulses, causing the command previously set on the sixth thumbwheel switch 143, a stop command, to be toggled into the remote access interface f. Alternatively, the command could have been a start command, corresponding to the four-bit code 0100, which would cause the digital data acquisition computer d to again begin scanning with channel 1.

Modifications of the present interface circuit will be obvious to persons skilled in the art. For example, other binary coded manual switch means could be utilized for setting the first and last channels, as well as the commands for the computer. Other step control circuitry to cause the scanning controller to step the pressure scanners and other home control circuitry to cause the scanner controller c to step the scanning valves a, b to their home ports may be substituted. Any remote access start circuitry to input a command to the computer after stepping of the scanners or postscan command circuitry to input a command responsive to stepping of the scanners to home position may be utilized. From the above examples, other modifications will suggest themselves.

I claim:

1. An interface circuit for use in controlling the operation of a plurality of multiple-port single-transducer pressure-scanners, each driven from port to port and to home position by a scanner controller which indicates by digital outputs the port currently scanned, by coupling the scanner controller to a digital data acquisition computer system which scans a plurality of channels to gather data from a plurality of sources, including a channel for each pressure scanner, the computer being of the type which produces a pulse indicating when a specific channel has been scanned, the interface circuit comprising first binary-coded manual switch means to input to the computer in digital form the first and last channels chosen to be utilized in scanning the plurality of pressure scanners, the chosen last channel being that channel for which the computer produces a pulse, second binary-coded manual switch means for user preparation of a digital start command for the computer to begin scanning at said chosen first channel third binary-coded manual switch means for user preparation of a digital post-scan command for the computer, step control circuit means to simultaneously cause the scanner controller to step each pressure scanner to its next port responsive to reception of said pulse from the computer indicating the last channel has been scanned, remote access start circuit means responsive to the stepping of the scanners, to input said prepared start command to the computer, home control circuit means to simultaneously cause the scanner controller to step each pressure scanner to its home port responsive to the digital output of the scanner controller indicating that the last active port has been scanned, and post-scan command circuit means, responsive to the home control circuit means having stepped the scanners to home position, to input such prepared post-scan command to the computer, whereby the interface circuit causes the digital data acquisition computer to loop repeatedly through the channels so utilized for pressure scanning, requiring only a single channel for each scanner.

2. The interface circuit defined in claim 1, wherein the first, second and third binary-coded manual switch means each includes a thumbwheel switch which converts a visual decimal indication to multi-bit binary form.

3. The interface circuit defined in claim 1, wherein the first binary-coded manual switch means includes a first thumbwheel switch upon which a computer command signal may be selected, a set of thumbwheel switches upon which the first channel and last channel may be selected, and a strobe switch so coupled as to cause, upon its closing, the selected command to be inputted to the computer.

4. The interface circuit defined in claim 1, wherein the step control circuit means includes a first one-shot coupled to receive said channel indicating pulse from the computer and produce an output upon receiving said pulse, and a relay responsive to the output of the first one-shot to drive the scanner controller.

5. The interface defined in claim 4, and wherein the remote access start circuit includes
a second one-shot responsive to the output of the first one-shot and coupled to the second manual switch means.

6. The interface circuit defined in claim 1, wherein the home control circuit means includes,
an AND gate so coupled by its inputs to the digital outputs of the scanner controller such that each input is on after the last active port is scanned,
a first one-shot coupled from the output of the AND gate, producing an output responsive to an output of the AND gate, and
a relay responsive to the output of the first one-shot to cause the scanner controller to drive the scanner to home position.

7. The interface circuit defined in claim 6, wherein the post-scan command circuit means includes
a second one-shot responsive to the output of the first one-shot and coupled to the third manual switch means.

8. The interface circuit defined in claim 1, wherein the second switch means includes
a thumbwheel switch having a visual decimal indication converted to multiple-bit binary form at a plurality of output lines, and
a plurality of two-input AND gates, one coupled to each thumbwheel switch output line, the output of the AND gates being coupled to the digital data acquisition computer, and the other input of each AND gate being coupled from the remote access start circuit means.

9. An interface circuit for use in controlling the operation of a multiple-port single-transducer pressure-scanning device, which indicates by digital outputs the port currently scanned, by a digital data acquisition computer which scans a plurality of channels to gather data from a plurality of sources, including one channel for each pressure transducer, the computer being of the type which produces a pulse indicating when a specific channel has been scanned, the interface circuit comprising
first manual switch means to input to the computer in digital form the first and last channels chosen to be utilized in scanning the pressure-scanning device, the chosen last channel being that channel for which the computer produces a pulse,
second manual switch means for preparing a start command signal for the digital computer to begin scanning at said first channel chosen,
third manual switch means for user preparation of a digital post-scan command signal for the computer,
step control circuit means, to cause the pressure-scanning device to step to its next port responsive to reception of said pulse from the computer indicating the last channel has been scanned,
remote access start circuit means to input said start command signal to the computer upon the step control means having stepped the scanning device,
home control means, responsive to the digital output of the scanning device, to determine that the last active port has been scanned and thereon to cause the scanning device to return to its home position, and
post-scan command circuit means, responsive to the home control circuit means having stepped the scanner to home position, to input the post-scan command signal to the digital computer.

10. A system for gathering data from a plurality of sources, including a plurality of pressure sources, comprising
a pressure-scanning system including a plurality of multiple-port single-transducer pressure-scanning values having analog outputs, a scanner controller which serves to simultaneously drive the scanning values from port to port and to home position, and which designates by a plurality of digital outputs which port is currently being scanned,
a digital data acquisition computer system including a CPU with a plurality of channel inputs to receive analog data and analog to digital conversion means, and including a remote access interface which permits access of the CPU by remote user commands, the CPU having means to produce a pulse indicating a specific channel has been scanned,
an interface circuit including
first binary-coded manual switch means to input to the computer in digital form the first and last channels chosen to be utilized in scanning the plurality of pressure scanners, the chosen last channel being that channel for which the computer produces a pulse,
second binary-coded manual switch means for user preparation of a digital start command for the computer to begin scanning at said first channel chosen,
third binary-coded manual switch means for user preparation of a digital post-scan command for the computer,
step control circuit means to simultaneously cause the scanner controller to step each pressure scanner to its next port responsive to reception of said pulse from the computer indicating the last channel has been scanned,
remote access start circuit means responsive to the stepping of the scanners, to input said prepared start command to the computer,
home control circuit means to simultaneously cause the scanner controller to step each pressure scanner to its home port responsive to the digital output of the scanner controller indicating that the last active port has been scanned, and
post-scan command circuit means, responsive to the home control circuit means having stepped the scanners to home position, to input such prepared post-scan command to the computer,
whereby the interface circuit causes the digital data acquisition computer to loop repeatedly through the channels so utilized for pressure scanning requiring only a single channel for each scanner.

* * * * *